Jan. 12, 1932.    R. G. ANDERSON    1,841,077
THREE-AXLE SPRING SUSPENSION
Filed Dec. 10, 1929
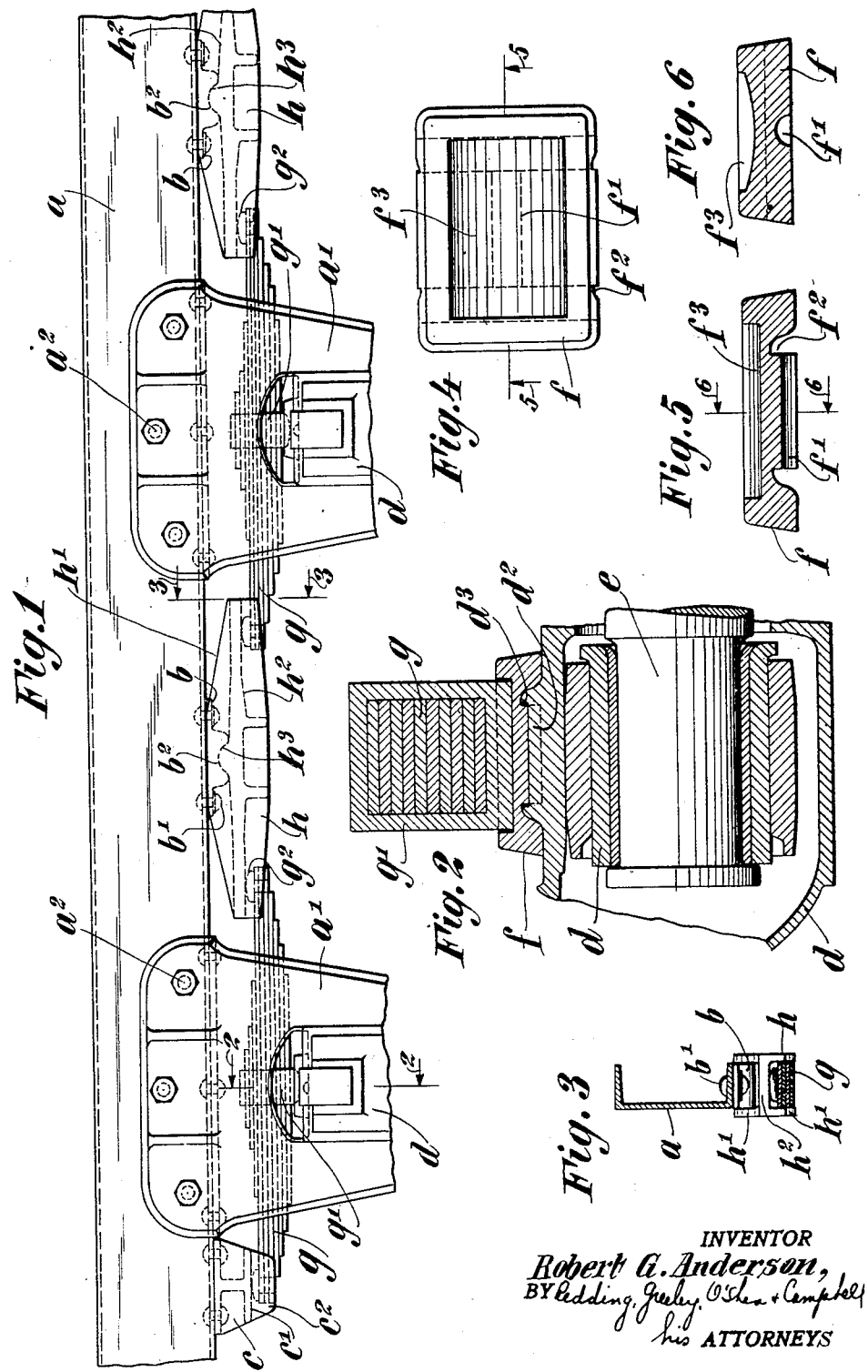
INVENTOR
Robert G. Anderson,
BY Redding, Greeley, O'Shea + Campbell
his ATTORNEYS Patented Jan. 12, 1932

1,841,077

UNITED STATES PATENT OFFICE

ROBERT G. ANDERSON, OF PLAINFIELD, NEW JERSEY, ASSIGNOR TO INTERNATIONAL MOTOR COMPANY, OF NEW YORK, N. Y., A CORPORATION OF DELAWARE

THREE AXLE SPRING SUSPENSION

Application filed December 10, 1929. Serial No. 412,991.

The present invention relates to railway trucks and embodies, more specifically, an improved three axle spring suspension by means of which the load carried by the truck may be distributed equally between the respective axles, complete equalization taking place.

As is commonly known, it is highly desirable to maintain constant traction for the driving units, as well as the complete equalization of load between the axles, thus affording the maximum available driving force per unit of load. It is furthermore very important to preserve, accurately, proper equalization of load to insure reliable operation of the power units and prevent overloading of certain of the units by reason of unequal loads assumed by the axles driven thereby.

Bearing in mind the factor of equalization of load, the present invention contemplates the provision of springs and equalizer bars for a three axle truck, these members being of such character as to enable complete equalization of load to be preserved at all times, the construction being such that the parts may be readily assembled and taken down without entirely removing the axles and associated parts from the truck frame.

It is an object of the present invention, accordingly, to provide an improved spring suspension and equalizer construction of such character that the elements thereof may be readily assembled and replaced without entirely dismantling the truck.

A further object of the invention is to provide a spring suspension and equalizer bar of such construction that complete equalization of load is maintained at all times.

Further objects, not specifically enumerated above, will be apparent as the invention is described in greater detail in connection with the accompanying drawings, wherein:

Figure 1 is a view in side elevation, partly broken away, showing a three axle truck constructed in accordance with the present invention.

Figure 2 is a view in section, taken on line 2—2 of Figure 1, and looking in the direction of the arrows.

Figure 3 is a view in section, taken on line 3—3 of Figure 1, and looking in the direction of the arrows.

Figure 4 is a plan view of an improved adapter plate for mounting a journal box upon a frame in accordance with the present invention.

Figure 5 is a view in section, taken on line 5—5 of Figure 4, and looking in the direction of the arrows.

Figure 6 is a view in section, taken on line 6—6 of Figure 5, and looking in the direction of the arrows.

Referring to the above drawings, $a$ designates the side frame member of a railway truck carrying three pedestal jaws $a'$. These jaws are secured to the frame $a$ by means of bolts $a^2$ and spaced in proper relationship for carrying the load.

Intermediate adjacent pairs of pedestal jaws $a'$, wear plates $b$ are provided. These wear plates are secured to the under portions of the frame $a$ by means of bolts or rivets $b'$, an inwardly extending groove $b^2$ being formed in the plates to receive a cooperating portion of an equalizer bar as described hereinafter. At either end of the truck frame $a$, brackets $c$ are secured, these brackets being provided with horizontal bearing surfaces $c'$ and spaced lateral retaining flanges $c^2$.

The brackets $c$ serve as a mounting means for the appropriate ends of springs to be described hereinafter, the horizontal surfaces $c'$ taking the thrust of the springs incident to the load carried thereby and supported by the respective axles.

Each pedestal jaw carries a journal box $d$ within which an axle $e$ is journaled by suitable bearing members $d'$. The tops of the journal boxes are formed with upwardly extending ribs $d^2$, having flanges $d^3$ formed at the extremities thereof. Upon the top of each journal box and carrying the weight supported by the respective springs, are adapter plates $f$ which are formed with recesses $f'$ and $f^2$ for receiving the ribs $d^2$ and flanges $d^3$, respectively. The adapter plates are formed upon their upper side with curved recesses $f^3$ within which spring clips $g'$ are received. Springs $g$, upon which the clips $g'$ are mounted, extend within the pedestal jaws and lie generally in the vertical planes of the channel members $a$.

The front and rear springs $g$ are mounted, at their opposite ends, upon the bracket $c$, suitable buttons $g^2$ being secured to each end of all of the springs to afford the desired rolling contact between the respective elements.

The inner ends of the front and rear springs have mounted thereon equalizer bars $h$. These equalizer bars are formed with parallel side flanges $h'$ extending above and below the horizontal web $h^2$ of the equalizer bars. A transverse rib $h^3$ is received within the groove $b^2$ and serves as a suitable pivot connection for the equalizer bars. It will be seen that the ends of the intermediate spring $g$ have mounted thereon the adjacent ends of the equalizer bars, the distant ends of such bars being mounted upon the buttons $g^2$ of the inner ends of the front and rear springs $g$. The side flanges $h'$ of the equalizer bars prevent lateral movement of the members with respect to each other and thus insure a sufficiently strong and positive structure. There is no positive connection for the springs and bars, all connections being through rubbing surfaces. The adapter plates and related mechanism constitute a simple and effective manner for mounting the elements and using them in connection with various truck frames interchangeably.

While the invention has been described with specific reference to the accompanying drawings, it is not to be limited, save as defined in the appended claim.

I claim as my invention:

In a spring suspension for railway trucks, an adapter plate, a journal box, a spring, the adapter being recessed to receive a projection on the spring, a projection on the journal box parallel to the axle, and spaced projections on the journal box to prevent movement of the adapter plate in the plane of the axle, said adapter plate being recessed to receive the projections.

This specification signed this 3rd day of December, A. D. 1929.

ROBERT G. ANDERSON.